United States Patent Office 3,644,638
Patented Feb. 22, 1972

3,644,638
COMPOSITIONS AND METHODS FOR RELIEVING BRONCHIAL SPASM WITH PROSTANOIC ACIDS AND ESTERS
Marvin E. Rosenthale, Havertown, and Milton Lapidus, Rosemont, Pa., assignors to American Home Products Corporation, New York, N.Y.
No Drawing. Continuation-in-part of applications Ser. No. 749,606, Aug. 2, 1968, and Ser. No. 870,990, Oct. 28, 1969. Said application Ser. No. 749,606 being a continuation-in-part of application Ser. No. 617,072, Feb. 20, 1967, and said application Ser. No. 870,990, being a division of application Ser. No. 749,606, Aug. 2, 1968. This application Aug. 24, 1970, Ser. No. 66,659
Int. Cl. A61k 27/00
U.S. Cl. 424—305                                    28 Claims

ABSTRACT OF THE DISCLOSURE

Compositions comprising compounds selected from the family of prostanoic acids and esters or salts thereof and a pharmacological carrier are useful to treat bronchial spasm in warm-blooded animals and to promote free breathing, especially when administered by the inhalation of an aerosol mist.

---

This application is a continuation-in-part of copending applications Ser. No. 749,606, filed Aug. 2, 1968, and Ser. No. 870,990, filed Oct. 28, 1969. Application Ser. No. 749,606 is in turn a continuation-in-part of application Ser. No. 617,072, filed Feb. 20, 1967, and all are now abandoned; and application Ser. No. 870,990 is a divisional of application Ser. No. 749,606, Aug. 2, 1968.

This invention relates to compositions for, and means to effect, bronchodilation and the facilitation of breathing. More particularly, it is concerned with the administration of compounds selected from the family of prostanoic acids or esters or salts thereof, to animals suffering from bronchial spasm.

BACKGROUND OF THE INVENTION

A number of compounds in a variety of combinations and dosage forms are currently available as bronchodilators, i.e.: substances able to relax the smooth muscle of the bronchial tree and thus control spasm and facilitate breathing in conditions affecting animals, such as bronchial asthma, bronchitis, bronchietasis, pneumonia, emphysema, and the like. All of the bronchodilator preparations incorporate one or more of three basic types of compounds: (a) sympathomimetic (adrenergic) agents, (b) xanthine derivatives and (c) corticosteroids. These agents can be used in combination with anti-tussives, expectorants, mucolytics, and the like.

The sympathomimetic agents most often used are epinephrine, isoproterenol, phenylephrine and ephedrine. These adrenergic agents are most powerful and useful drugs in the relief of severe asthmatic spasm (status asthmaticus); however, as with other dilators they have untoward side effects. Some of the more undesirable of these are stimulation of the cardiovascular and central nervous system, hyperglycemic and tolerance (tachyphylaxis), with greatly reduces the effectiveness of these drugs.

The two xanthine derivatives most widely used are theophylline and aminophylline. Some of the problems associated with therapy here include variable oral absorption, cardiovascular effects and inability to achieve adequate levels without gastric irritation.

Many cases of asthma and status asthmaticus refractory to usual treatment methods are now controlled by the corticosteroids. However, long term treatment of asthma with steroids involves the risk of sodium retention, hypertension, ulcers, calcium loss from osseous structures and other well known side effects.

Thus, the agents available to now have a number of problems associated with their use, including toxicity, low activity (especially in the xanthines), adverse effect on the cardiovascular system (especially in the sympathomimetics) and fluid retention or edema (with the corticosteroids). An addition to the collection of agents to treat bronchial spasm would clearly be welcome. Thus, a definite need exists for means employing effective and well-tolerated bronchodilating agents.

The difficulty in finding such agents is immediately obvious to those skilled in the art. It is a matter of common knowledge and experience, for example, that many compounds that relax smooth muscles are not bronchodilators by all common routes of administration (and especially by the aerosol route of administration). For example, for some obscure reason, ephedrine is a smooth muscle relaxant and is an orally active branchodilator, but not by aerosol; epinephrine, also a smooth muscle relaxant, is used by aerosol but not orally. And aminophylline, a drug which can relax *bronchial* smooth muscle in vitor or by injection in vivo is inactive as a bronchodilator aerosol. In view of this it is surprising now to find a means which, even though characterized by smooth muscle relaxing activity, provides bronchodilation by injection, by oral administration *and* by administration via the aerosol route.

It is, accordingly, a primary object of this invention to provide a means to relieve bronchial spasm and to facilitate breathing which is particularly effective, non-toxic and characterized by high levels of activity. A further object is to provide novel bronchodilating dosage forms which are particularly effective, non-toxic and characterized by high levels of activity.

DESCRIPTION OF THE INVENTION

These objects are realized by use of a composition which is, in essence: a bronchodilating composition comprising
(a) a compound of Formula I:

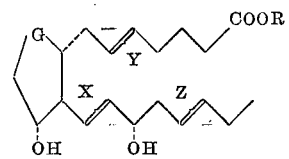

wherein (i) G is C=O, X is a trans-double bond and Y and Z are single bonds;
(ii) G is C=O and X, Y and Z are single bonds;
(iii) G is C=O, X is a trans-double bond, Y is a cis-double bond and Z is a single bond;
(iv) G is

X is a trans-double bond and Y and Z are single bonds;
(v) G is C=O; X is a trans-double bond and Y and Z are cis-double bonds;
(vi) G is

X is a trans-double bond and Y and Z are cis-double bonds; and

R is hydrogen, alkyl of from about 1 to about 6 carbon atoms, alkali metal, or a pharmacologically-acceptable cation derived from ammonia or a basic amine; and (b) n inert pharmacologically-acceptable carrier, the proportion of said compound in said composition being sufficient to impart brochodilating activity thereto.

Special mention is made of several particularly valuable embodiments of the instant invention. These are, respectively, a composition as hereinabove defined wherein said compound is 7-[3-hydroxy-2-(3-hydroxy-1-octenyl)-5-oxocyclopentyl]-5-heptenoic acid (R is hydrogen);
methyl 7-[3-hydroxy-2-(3-hydroxy-1-octenyl)-5-oxocyclopentyl]-5-heptenoate (R is methyl);
7-[3-hydroxy-2-(3-hydroxy-1-octenyl)-5-oxocyclopentyl] heptanoic acid;
7-[3-hydroxy-2-(3-hydroxyoctanyl)-5-oxocyclopentyl] heptanoic acid; and
7-[3,5-dihydroxy-2-(3-hydroxy-1-octenyl)-cyclopentyl] heptanoic acid.

Also contemplated by this invention are the said compositions in dosage unit form. An especially useful embodiment of this invention is a composition as above defined wherein said dosage unit form is a solution formulated for administration by the oral inhalation route. Special mention is also made of a further convenient and valuable embodiment of the instant invention, which is a composition as defined above wherein said dosage unit form is self-propelling and capable of providing the medicament of Formula I in aerosol form suitable for inhalation therapy.

The means of this invention, broadly stated, is a method to relieve bronchial spasm and to facilitate breathing which comprises administering to a warm-blooded animal suffering from bronchial spasm a composition as defined above, in dosage unit form, the quantity of said compound of Formula I administered being sufficient to alleviate the bronchial spasm. Particularly valuable embodiments of the instant invention are methods wherein the said compounds of Formula I are, respectively, 7-[3-hydroxy-2-(3-hydroxy-1-octenyl)-5-oxocyclopentyl]-5-heptenoic acid;
methyl 7-[3-hydroxy-2-(3-hydroxy-1-octenyl)-5-oxocyclopentyl]-5-heptenoate;
7-[3-hydroxy-2-(3-hydroxy-1-octenyl)-5-oxocyclopentyl] heptanoic acid;
7-[3-hydroxy-2-(3-hydroxyoctanyl)-5-oxocyclopentyl] heptanoic acid; and
7-[3,5-dihydroxy-2-(3-hydroxy-1-octenyl)-cyclopentyl] heptanoic acid.

Also contemplated as a valuable embodiment is the method wherein said composition is administered by the oral inhalation route. Special mention is made of a further embodiment which is the method defined above wherein said composition is in a self-propelling dosage unit form and is administered by inhalation of an aerosol of said composition.

The medicaments of Formula I employed in the compositions and methods of this invention comprise selected compounds of the prostaglandin series, a family of biologically-active lipids containing 20 carbon atoms and having the same basic carbon skeleton, "prostanoic acid":

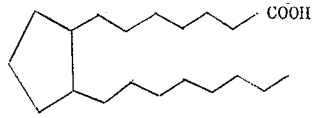

and alkyl esters, alkali metal salts, and salts of compounds of Formula I with ammonia or a basic amine. The acids can be isolated from natural products, or they can be prepared by enzymatic syntheses. The derivatives are prepared by entirely conventional techniques well known to those skilled in the art, but also to be illustrated in detail hereinafter.

The term "alkyl of from about 1 to about 6 carbon atoms" when used herein and in the appended claims includes straight and branched chain hydrocarbon radicals, illustrative members of which are methyl, ethyl, n-propyl, i-propyl, n-butyl, t-butyl, n-pentyl, n-hexyl, 3-methylpentyl, 2,3-dimethylbutyl, and the like. "Alkali metal" includes, for example, sodium, potassium, lithium, and the like. A "pharmacologically-acceptable cation derived from ammonia or a basic amine" contemplates the positively charged ammonium ion and analogous ions derived from organic nitrogenous bases strong enough to form such cations. Bases useful for the purpose of forming pharmacologically-acceptable non-toxic addition salts of such compounds containing free carboxyl groups form a class whose limits are readily understood by those skilled in the art. Merely for illustration, they can be said to comprise, in cationic form, those of the formula:

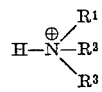

wherein $R^1$, $R^2$, and $R^3$, independently, are hydrogen, alkyl of from about 1 to about 6 carbon atoms, cycloalkyl of from about 3 to about 6 carbon atoms, monocarbocyclicaryl of about 6 carbon atoms, monocarbocyclicarylalkyl of from about 7 to about 11 carbon atoms, hydroxyalkyl of from about 1 to about 3 carbon atoms, or monocarbocyclicarylhydroxyalkyl of from about 7 to about 15 carbon atoms or, when taken together with the nitrogen atom to which they are attached, any two of $R^1$, $R^2$, and $R^3$ form part of a 5- to 6-membered heterocyclic ring containing carbon, hydrogen, oxygen, or nitrogen, said heterocyclic rings and said monocarbocyclicaryl groups being unsubstituted or mono- or dialkyl substituted, said alkyl groups containing from about 1 to about 6 carbon atoms. Illustrative therefore of R groups comprising pharmacologically-acceptable cations derived from ammonia or a basic amine are ammonium, mono-, di-, and trimethylammonium, mono-, di- and triethylammonium, mono-, di-, and tripropylammonium (iso and normal), ethyldimethylammonium, benzyldimethylammonium, cyclohexylammonium, benzylammonium, dibenzylammonium, piperidinium, morpholinium, pyrrolidinium, piperazinium, 1-methylpiperidinium, 4-ethylmorpholinium, 1-isopropylpyrrolidinium, 1,4-dimethylpiperazinium, 1-n-butylpiperidinium, 2-methylpiperidinium, 1-ethyl-2-methylpiperidinium, mono-, di- and triethanolammonium, ethyldiethanolammonium, n-butylmonoethanol ammonium, tris (hydroxymethyl)methylammonium, phenylmonoethanolammonium, and the like.

The free carboxylic acid of Formula I can be prepared by isolation from natural products, such as accessory genital materials, for example, prostate glands or sperm. More convenient, however, and preferred because it gives a product substantially free of tissue fragments, cellular debric and foreign proteins, is a biosynthetic method comprising incubating a fatty acid selected from arachidonic acid (5,8,11,14-eicosatetraenoic acid), homo-γ-linolenic acid (8,11,14-eicosatrienoic acid) and 5,8,11,14,17-eicosapentaenoic acid in the presence of an enzyme derived from sheep seminal vesicles. A useful biosynthetic method for the preparation of the active ingredient acids (Formula I, R is hydrogen) will be described in detail hereinafter. The esters of Formula I (R is alkyl) are prepared by standard methods, such as for example, by treating a solution of the free acids with diazomethane or other appropriate diazohydrocarbons, such as diazoethane, 1-diazo-2-ethylpentane, and the like. The alkali metal carboxylates of the invention can be prepared by mixing stoichiometrically equivalent amounts of the free acids of Formula I, preferably in aqueous solution, with solutions of alkali metal bases, such as sodium, potassium, and lithium hydroxides or carbonates, and the like, then freeze drying the mixture to leave the product as a residue. The amine salts are prepared by mixing the free acids, preferably in solution, with a solution of the appropriate amine, in water, isopropanol, or the like, and freeze drying the mixture to leave the product as a residue.

The instant compositions can be administered in a variety of dosage forms, the oral route being used primarily for maintenance therapy while injectables tend to be more useful in acute emergency situations. Inhalation (aerosols and solution for nebulizers) seems to be somewhat faster acting than other oral forms but slower than injectables and this method combines the advantages of maintenance and moderately-acute stage therapy in one dosage unit.

The daily dose requirements vary with the particular compositions being employed, the severity of the symptoms being presented, and the animal being treated. The dosage varies with the size of the animal. With large animals (about 70 kg. body weight), by the oral inhalation route, with for example a hand nebulizer or a pressurized aerosol dispenser the ordinarily effective dose is from about 100 micrograms to about 300 micrograms about every four hours, as needed. By the oral ingestion route, the effective dose is from about 5 to about 20 mg., preferably from about 10 to about 15 mg. up to a total of about 60 mg. per day. By the intravenous route, the ordinarily effective dose is from about 100 micrograms to about 500 micrograms, preferably about 350 micrograms per day. Thus, the useful dosage range for a 70 kg. warm-blooded animal is from about 0.00142 mg./kg. to about 0.86 mg./kg. per day.

For unit dosages, the active ingredient can be compounded into any of the usual oral dosage forms including tablets, capsules and liquid preparations such as elixirs and suspensions containing various coloring, flavoring, stabilizing and flavor masking substances. For compounding oral dosage forms the active ingredient can be diluted with various tableting materials such as starches of various types, calcium carbonate, lactose, sucrose and dicalcium phosphate to simplify the tableting and capsulating process. A minor proportion of magnesium stearate is useful as a lubricant. In all cases, of course, the proportion of the active ingredient in said composition will be sufficient to impart bronchodilating activity thereto. This will range upward from about 0.001% by weight of active ingredient in said composition.

For administration by the oral inhalation route with conventional nebulizers or by oxygen aerosolization it is convenient to provide the instant active ingredient in dilute aqueous solution, preferably at concentrations of about 1 part of medicament to from about 100 to 200 parts by weight of total solution. Entirely conventional additives may be employed to stabilize these solutions or to provide isotonic media, for example, sodium chloride, sodium citrate, citric acid, sodium bisulfite, and the like can be employed.

For administration as a self-propelled dosage unit for administering the active ingredient in aerosol form suitable for inhalation therapy the composition can comprise the active ingredient suspended in an inert propellant (such as a mixture of dichlorodifluoromethane and dichlorotetrafluoroethane) together with a co-solvent, such as ethanol, flavoring materials and stabilizers. Instead of a co-solvent there can also be used a dispersing agent such as oleyl alcohol. Suitable means to employ the aerosol inhalation therapy technique are described fully in U.S. 2,868,691 and 3,095,355, for example.

In the preliminary evaluation of the bronchodilating compositions and methods of this invention, and as an indication of their valuable activity, intravenous administration of 4–8 mcg./kg. of 1-[3-hydroxy-2,3-hydroxy-1-octenyl)-5-oxocyclopentyl]-5-heptenoic acid to anesthetized guinea pigs was effective in preventing bronchoconstriction due to the intravenous administration of histamine 3 mcg./kg. acetylcholine 5–20 mcg./kg., serotonin 3 mcg./kg. and bradykinin 2–32 mcg./kg. It is noteworthy that the average duration of activity in this test, using 25 percent inhibition as the endpoint, was 3–5 minutes, and that the intravenous administration of 4 mcg./kg. of the active ingredient caused a mean blood pressure drop of only 12 mm. Hg of less than a minute duration. This test was used because results of this method are often substantially similar to results obtained with other highly effective brochodilating agents. Similarly administration of 1–6 mcg./kg. of 7-[3-hydroxy-2-(3-hydroxyoctanyl)-5-oxocyclopentyl]-heptanoic acid was effective to prevent bronchoconstriction due to 3 mcg./kg. of histamine and 5–20 mcg./kg. of acetylcholine, with an average duration of activity ranging from just under 5 minutes to 5 minutes. An i.v. dose of 8 mcg./kg. of 7-[3-hydroxy-2-(3-hydroxy-1-octenyl) - 5 - oxocyclopentyl-heptanoic acid was effective to prevent bronchoconstriction to 3 mcg./kg. of histamine and an i.v. dose of 30 mcg./kg. of [3,5 - dihydroxy - 2-(3-hydroxy-1-octenyl)-cyclopentyl]-heptanoic acid also prevented bronchoconstriction due to administration of 5–20 mcg./kg. of acetylcholine.

In a second test, the bronchodilator activities of the instant active ingredients were measured by exposing guinea pigs to an aerosol of the compounds at various concentrations and time intervals. The animals were then challenged with histamine aerosol, and the protection from respiratory difficulties were measured.

In carrying out this test a number of animals, in replicates, are exposed to the drug aerosol spray in chamber A for a 2-minute period and remain exposed to the aerosol particles for 1 minute after cessation of spraying (3 minute total exposure to drug). The animal is then immediately transferred to chamber B previously sprayed with histamine for a 1-minute perod, and the time necessary for onset of respiratory difficulty (T) is noted. The pigs previously had been evaluated to determine their mean convulsion times (C) to obtain control values, by exposing them to the mist and measuring the time required until each begins to convulse. An animal that can withstand 3 times its morning perconvulsion time is considered completely protected. Individual control (C) and post drug preconvulsion times (T) are recorded and an activity value calculated by the formula, (T/C). A mean (T/C) value greater than 1.2 indicates activity. This test is based on a technique described by Siegmund et al., J. Pharmacol. 90, 254 (1947) and 97, 14 (1949) and its clinical correlation is excellent.

The results of the tests are tabulated in Tables I through IV below:

TABLE I.—EFFECT OF AEROSOLIZED 7-[3-HYDROXY-2-(3-HYDROXY-1-OCTENYL)-5-OXOCYCLOPENTYL]5-HEPTENOIC ACID ON BRONCHOCONSTRICTION IN THE UNANESTHETIZED GUINEA PIG

| Percent spray concentration | Number of pigs | Number of pigs completely protected | Mean T/C score |
|---|---|---|---|
| 0%–0.06 M PO₄ buffer, control | 6 | 0/6 | 0.92 |
| 0.0001 | 10 | 1/10 | 1.59 |
| 0.0005 | 10 | 2/10 | 2.19 |
| 0.001 | 10 | 8/10 | 2.78 |
| 0.005 | 10 | 4/10 | 2.40 |
| 0.01 | 10 | 5/10 | 2.34 |
| 0.05 | 10 | 9/10 | 2.89 |
| 0.1 | 15 | 12/15 | 2.79 |
| 0.2 | 10 | 9/10 | 2.99 |

TABLE II.—EFFECT OF AEROSOLIZED 7-[3-HYDROXY-2-(3-HYDROXYOCTANYL)-5-OXOCYCLOPENTYL]-HEPTANOIC ACID ON BRONCHOCONSTRICTION IN THE UNANESTHETIZED GUINEA PIG

| Percent spray concentration | Number of pigs | Number pigs having T/C 1.5 | Number of pigs completely protected TC=3.0 | Mean T/C score |
|---|---|---|---|---|
| 0.001 | 6 | 0 | 0 | 1.2 |
| 0.01 | 5 | 5 | 1 | 2.2 |

TABLE III.—EFFECT OF AEROSOLIZED 7-[3-HYDROXY-2-(3-HYDROXY-1-OCTENYL)-5-OXOCYCLOPENTYL]-HEPTANOIC ACID ON BRONCHOCONSTRICTION IN THE UNANESTHETIZED GUINEA PIG

| Percent spray concentration | Number of pigs | Number of pigs completely protected | Mean $T/C$ score |
|---|---|---|---|
| 0.00025 | 6 | 0 | 1.66 |
| 0.0005 | 6 | 2 | 2.15 |
| 0.001 | 6 | 4 | 2.46 |
| 0.005 | 9 | 8 | 2.95 |

TABLE IV.—EFFECT OF AEROSOLIZED METHYL 7-[O HYDROXY-2-(3-HYDROXY-1-OCTENYL)-5-OXOCYCL-3 PENTYL]-5-HEPTENOATE ON BRONCHOCONSTRICTION IN THE UNANESTHETIZED GUINEA PIG

| Percent spray concentration | Number of pigs | Number of pigs completely protected | Mean $T/C$ score |
|---|---|---|---|
| 0.00001 | 6 | 0 | 1.2 |
| 0.0005 | 6 | 0 | 1.09 |
| 0.001 | 6 | 3 | 2.51 |
| 0.005 | 6 | 0 | 1.77 |

Since a score of 1.2 or greater indicates activity and an animal that can withstand three times its control preconvulsion time is considered completely protected, the bronchodilating effectiveness of the instant compounds is readily apparent.

In Table V is shown the lack of toxicity noted with concentrated aerosols of one of the instant compounds. Pigs were actively sprayed with 7-[3-hydroxy-2-(3-hydroxy-1-octenyl)-5-oxocyclopentyl]-5-heptenoic acid for 2 minutes and then left in the chamber for an additional three minutes thus exposing them to more drug for longer periods of time than was necessary in the histamine study.

TABLE V.—EFFECT OF AEROSOLIZED ACTIVE INGREDIENT ON NORMAL BUINEA PIGS

| Percent spray concentration | Number of pigs | Effects |
|---|---|---|
| 0.05 | 5 | No changes noted. |
| 0.1 | 6 | Do. |
| 0.2 | 5 | 1/5 pigs had slow respiration and tilted head to one side. |

The results of these experiments show that the instant compositions are potent, short acting bronchial smooth muscle dilators in guinea pigs by the intravenous and aerosol routes.

The following procedure is intended to describe means to obtain the instant active ingredients of Formula I in a form fully satisfactory for use in the compositions and methods of this invention.

PROCEDURE A

7-[3-hydroxy-2-(3-hydroxy-1-octenyl)-5-oxocyclopentyl]-5-heptenoic acid

Five kilograms of frozen sheep seminal vesicles are homogenized with 5 liters of 0.1 M ammonium chloride buffer, pH 8.5, to which is added 5 l. of this same buffer containing 2.5 g. of arachidonic acid. After adjusting the pH to 8.0 with 6 N ammonium hydroxide the homogenate is incubated for 1 hour at 387° C. At the end of this period the pH is adjusted to 7.0 with 6 N hydrochloric acid. After addition of 45 liters of cold acetone, the mixture is filtered and the filtrate is extracted with n-hexane. The aqueous acetone is then concentrated to one fourth of the original volume, adjusted to pH 3.0 with hydrochloric acid and extracted with methylene chloride. The product is extracted from the methylene chloride with 0.2 M sodium phosphate buffer, pH 8.0. The aqueous extract is acidified to pH 3.0 and reextracted with methylene chloride. Concentration of the methylene chloride fraction followed by cooling yields crystalline product, also known as PGE$_2$.

PROCEDURE B

Methyl 7-[3-hydroxy-2-(3-hydroxy-1-octenyl)-5-oxocyclopentyl]-5-heptenoate

To a dry ether solution of one milligram (2.8 micromoles) of the crystalline acid of Procedure A is added a slight excess of diazomethane, prepared in ether from four micromoles of nitrosomethylurethane. The reaction mixture is allowed to stand for five minutes and the ether and excess diazomethane are distilled off. On distillation to dryness there is obtained, as a residue, the desired product, also known as the methyl ester of PGE$_2$.

PROCEDURE C

7-[3-hydroxy-2-(3-hydroxyoctanyl)-5-oxocyclopentyl]-5-heptanoic acid

7 - [3 - hydroxy - 2 - (3-hydroxy-1-octenyl)-5-oxocylopentyl]-5-heptenoic acid, 120 mg., in 10 ml. of absolute ethanol is added to a pre-reduced suspension of 20 mg. platinum oxide (84%) in 5 ml. absolute ethanol. Hydrogenation is conducted for 1 hour at 27° C. and 751 mm. and 18 ml. hydrogen are absorbed. Removed of the catalyst by filtration, evaporation of the solvent at 40° C./10 mm. and thorough drying of the residue at 25° C./0.02 mm. provides crude product, also known as 13,14-dihydro PGE$_1$, as a brown gum, $\lambda_{max.}^{CHCl_3}$ 

3.00 m. (O—H), 3.77 sh. m., 4.30 sh. m. (acidic O—H), 5.79 s. (5-ring carbonyl), 5.85 sh. s. (acid carbonyl) $\mu$.

PROCEDURE D

7 - [3 - hydroxy - 2 - (3-hydroxy-1-octenyl-5-oxocyclopentyl] - 5 - heptanoic acid and 7-[3,5-dihydroxy-2-(3-hydroxy - 1-octenyl)-cyclopentyl]-5-heptanoic acid Sheep vesicular glands are frozen, by dropping them into solid $CO_2$, immediately after their removal from freshly slaughtered animals. The frozen glands (18.7 kg.) are ground in a motor-driven meat grinder. The ground gland is added to a mixture of 37.4 liters of Krebs-Ringer solution (a nutrient medium) made alkaline to pH 7.4 with sodium bicarbonate and 108 g. of nicotinamide (a cofactor). To the mixture is added 35.3 g. of 8,11,14-eicosatrienoic acid and the resulting suspension is mixed thoroughly for about 5 minutes before being transferred to an incubation tank and maintained at 37° C. for 2 hours. During the incubation period a mixture of 95 percent oxygen and 5 percent carbon dioxide is bubbled through the suspension at a rate of about 8 liters per minute.

The material from the incubation step is extracted three times with 100 liters of acetone over a period of 24 hours and the spent gland extracts are evaporated to dryness under reduced pressure. The residue is assayed by paper strip chromatography and the major products are title compounds, respectively PGE$_1$ and PGF$_{1\alpha}$ and 10 - [3 - hydroxy - 2-pentyl-5-oxocyclopentyl]-8-decenoic acid and 10 - [3,5-dihydroxy-2-pentylcyclopentyl]-8-decenoic acid.

Recovery is accomplished as follows: The residue is subjected to a five-stage countercurrent distribution between equal volumes of ether and 0.5 molar phosphate buffer at pH 6.4. The buffer phases are acidified and extracted three times with ether. All phases are evaporated to dryness, weighed, and the physiological activity of each is determined using the smooth muscle stimulating test of Von Euler, Skan. Arch. Physiol, 81, 65–80 (1939). The samples containing the bulk of the major components are each pooled and treated separately as follows. Each sample is dissolved in the mobile phase of an isooctano:chloroform:methanol:water (1:1:10:10) system at the rate of about 100 mg. per 3 to 5 mls. of mobile phase. A column in which 4 ml. of static phase (upper phase) of an isooctanol:chloroform:methanol: water (1:1:10:10) system is supported on 4.5 g. of hydrophobic diatomite (kieselguhr treated with chloromethylsilane) is charged with 100 mg. of the pooled sample mixed with a minimum of about 3 to 5 ml. of mobile phase, and then developed with mobile phase. The eluate fractions are assayed for smooth muscle activity using the test of Von Euler. Those fractions showing peak activities are evaporated leaving the essentially pure components of the original mixture.

PROCEDURE E

7 - [3 - hydroxy - 2 - (3-hydroxy-1,5-octadienyl)-5-oxocyclopentyl] - 5 - heptenoic acid and 7-[3,5-dihydroxy-2 - (3-hydroxy-1,5-octadienyl)-cyclopentyl]-5-heptenoic acid The processes of Procedure D are repeated substituting for the arachidonic acid, a stoichiometrical amount of 5,8,11,14,17-eicosapentaenoic acid and there is obtained a mixture of the title compounds. These are separated by the process of Procedure D and the active ingredients, also known as $PGE_3$ and $PGF_3\alpha$, respectively, are obtained as residues after evaporation of the solvents.

DESCRIPTION OF THE PREFERRED EMBODIMENTS

The following examples are given simply to illustrate this invention, but not in any way to limit its scope.

EXAMPLE I

Two compositions are prepared comprising, respectively, 1 part of 7-[hydroxy-2-(3-hydroxy-1-octenyl)-5-oxocyclopentyl]-5-heptenoic acid and 100 and 200 parts by weight of 0.06 M aqueous phosphate buffer. For administration to relieve bronchial spasm by oral inhalation with a hand nebulizer, for animals of from about 30 to about 70 kilograms body weight, use 3–7 inhalations of the 1:100 solution or 5–15 inhalations of the 1:200 solution, every four hours as needed, using each time up to 0.3 ml. of the 1:100 solution, and up to 0.5 ml. of the 1:200 solution per treatment.

EXAMPLE II

Tablets for oral use are prepared with the following formulations:

|  | Milligrams | |
|---|---|---|
| 7-[3-hydroxy-2-(3-hydroxy-1-octenyl)-5-oxocyclopentyl]-5-heptenoic acid | 10 | 15 |
| Lactose | 287 | 282 |
| Magnesium stearate | 3 | 3 |
| Total | 300 | 300 |

One tablet containing either 10 or 15 mg. of active ingredient is administered to an animal of about 70 kg. body weight suffering from bronchial spasm. Occasionally, 2–10 mg. tablets are required. Up to a total of 60 mg. per day can be well tolerated (divided into 15 mg. four times daily or 20 mg. three times daily). For animals of about 35 kg. of body weight, half these doses are used.

EXAMPLE III

The procedure of U.S. 2,868,691 is used to prepare the instant compositions in self-propelling dosage unit forms. "A suitable measured quantity of the medicament is mixed with, and dissolved in, a measured amount of the cosolvent. A stabilizer, if desired, is added. A measured quantity of the resulting solution is then introduced into an open container. The open container and its contents are then cooled, preferably to a temperature below the boiling point of the propellant to be employed. A temperature of −25° F. is usually satisfactory. A measured quantity of the liquified propellant which also has been cooled below its boiling point is then introduced into the container and mixed with the solution already present. The quantities of the components introduced into the container are calculated to provide the desired concentration in each of the final compositions. Without permitting the temperature of the container and its contents to rise above the boiling point of the propellant, the container is sealed with a closure equipped with a suitable dispensing valve arrangement. Upon warming to room temperature the contents of the container are mixed by agitation of the container to insure complete solution of the medicament. The sealed container is then ready to dispense the composition and provide the medicament in aerosol form."

Nebulizing units each containing 15 ml. are filled according to the manipulative procedure described above with the following compositions:

Composition 1

|  | Percent |
|---|---|
| 7 - [3-Hydroxy-2-(3-hydroxy-1-octenyl)-5-oxocyclopentyl]-5-heptenoic acid | 0.25 |
| Ethanol | 34.75 |
| Dichlorodifluoromethane | 65.00 |
| | 100.00 |

Compositions 2 and 3

|  | Percent | |
|---|---|---|
| 7-[3-Hydroxy-2-(3-hydroxy)-1-octenyl)-5-oxocyclopentyl]-5-heptenoic acid | 0.25 | 0.25 |
| Ethanol | 34.75 | 34.75 |
| Dichlorotetrafluoroethane | 40 | 45.5 |
| Dichlorodifluoromethane | 25 | 19.5 |
| Total | 100 | 100 |

These packages when adjusted to deliver 300 single oral inhalations provide a single dose of 125 micrograms. A single inhalation is administered to control an acute bronchial spasm. If necessary, after a full minute has elapsed, a second inhalation can be administered.

EXAMPLE IV

An injectable unit dosage composition is prepared by dissolving 68 mg. of 7-[3-hydroxy-2-(3-hydroxy-1-octenyl)-5-oxocyclopentyl]-5-heptenoic acid is 20.4 ml. of 0.2 M sodium phosphate buffer, pH 8, and is made up to 68 ml. with distilled water. This results in a solution of the medicament in the form of its sodium salt, which is 0.06 M in phosphate, pH 7.4. This solution of medicament, containing 1 mg./ml. of active ingredient (calculated as the free acid) is stored frozen at −20° C. until thawed for sterile filtration. After sterile filtration through a 0.45 micron filter, 1 ml. aliquots are filled aseptically into sterile ampules. The ampules are flame sealed and the contents are frozen and stored at −20° C. until needed.

EXAMPLE V

The procedures of Examples I–IV are used to prepare bronchodilating compositions of the following active ingredients:

methyl 7-[3-hydroxy-2-(3-hydroxy - 1 - octenyl)-5-oxocyclopentyl]-5-heptenoate;

7-[3-hydroxy-2-(3-hydroxyoctanyl) - 5 - oxocyclopentyl]-heptanoic acid;

7-[3-hydroxy-2-(3-hydroxy-1-octenyl) - 5 - oxocyclopentyl]-heptanoic acid;

7 - [3,5-dihydroxy-2-(3-hydroxy-1-octenyl)-cyclopentyl]-heptanoic acid;

7-[3-hydroxy-2-(3-hydroxy - 1,5 - octadienyl)-5-oxocyclopentyl]-5-heptenoic acid; and 7 - [3,5-dihydroxy-2-(3-hydroxy - 1,5 - octadienyl)-cyclopentyl]-5-heptenoic acid.

These are useful for administration by the oral inhalation, the oral, the aerosol inhalation, and the injectable routes, respectively.

We claim:
1. A bronchodilating and bronchial spasm reducing composition formulated for inhalation therapy from a nebulizer such that each dose comprises:
    (a) a bronchodilating and bronchial spasm reducing amount of a compound of the formula

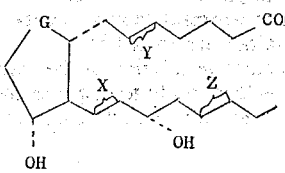

wherein
    (i) G is C=O, X is a trans-double bond and Y and Z are single bonds;
    (ii) G is C=O and X, Y and Z are single bonds;
    (iii) G is C=O, X is a trans-double bond, Y is a cis-double bond and Z is a single bond;
    (iv) G is

X is a trans-double bond and Y and Z are single bonds;
    (v) G is C=O; X is a trans-double bond and Y and Z are cis-double bonds;
    (vi) G is

X is a trans-double bond and Y and Z are cis-double bonds; and R is hydrogen, alkyl of from 1 up to about 6 carbon atoms, alkali metal, or a pharmacologically-acceptable cation derived from ammonia or a basic amine; and
    (b) a pharmacologically-acceptable inhalation carrier, in an amount sufficient to provide a composition administerable by the oral inhalation route.

2. The composition of claim 1 wherein (b) is present in the amount of from about 100 up to about 200 times the amount of (a), by weight.

3. The composition of claim 1 wherein (b) is an aqueous phosphate buffer of about 0.06 M.

4. The composition of claim 1 wherein each dose provides from about 100 micrograms up to about 300 micrograms of (a).

5. A self-propelled aerosol dosage form nebulizer unit for inhalation therapy consisting essentially of an aerosol container adapted to provide dosage unit form inhalation therapy containing an aerosol propellant and the composition of claim 1.

6. A composition as defined in claim 1 wherein said compound is 7 - [3-hydroxy-2-(3-hydroxy-1-octenyl)-5-oxocyclopentyl]-5-heptenoic acid.

7. A composition as defined in claim 1 wherein said compound is methyl 7-[3-hydroxy - 2 - (3-hydroxy-1-octenyl)-5-oxocyclopentyl]-5-heptenoate.

8. A composition as defined in claim 1 wherein said compound is ethyl 7-[3-hydroxy-2-(3-hydroxy-1-octenyl)-5-oxocyclopentyl]-5-heptenoate.

9. A composition as defined in claim 1 wherein said compound is 7 - [3-hydroxy-2-(3-hydroxy-1-octenyl)-5-oxocyclopentyl]-heptanoic acid.

10. A composition as defined in claim 1 wherein said compound is 7 - [3-hydroxy-2-(3-hydroxy-1-octenyl)-5-oxocyclopentyl]-heptanoate.

11. A composition as defined in claim 1 wherein said compound is 7 - [3-hydroxy-2-(3-hydroxyoctanyl)-5-oxocyclopentyl]-heptanoic acid.

12. A composition as defined in claim 1 wherein said compound is 7 - [3,5-dihydroxy-2-(3-hydroxy-1-octenyl)-cyclopentyl]-5-heptenoic acid.

13. A method of relieving bronchial spasm and facilitating breathing in warm blooded animals which comprises administering to a warm blooded animal in need thereof an amount sufficient to relieve bronchial spasm and facilitate breathing in said warm blooded animal of a composition comprising
    (a) a compound of the formula

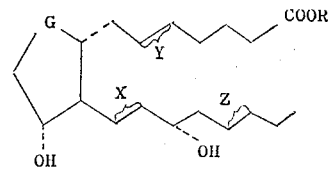

wherein
    (i) G is C=O, X is a trans-double bond and Y and Z are single bonds;
    (ii) G is C=O and X, Y and Z are single bonds;
    (iii) G is C=O, X is a trans-double bond, Y is a cis-double bond and Z is a single bond;
    (iv) G is

X is a trans-double bond and Y and Z are single bonds;
    (v) G is C=O; X is a trans-double bond and Y and Z are cis-double bonds;
    (vi) G is

X is a trans-double bond and Y and Z are cis-double bonds; and R is hydrogen, alkyl of from 1 up to about 6 carbon atoms, alkali metal, or a pharmacologically-acceptable cation derived from ammonia or a basic amine; and
    (b) a pharmacologically-acceptable carrier.

14. A method as defined in claim 13 wherein said administering is effected by the oral route.

15. A method as defined in claim 14 wherein said administering is effected by oral ingestion.

16. A method as defined in claim 15 wherein (a) is administered from about 5 up to about 20 mg. per dose.

17. A method as defined in claim 14 wherein said administering is effected by the oral inhalation route.

18. A method as defined in claim 17 wherein (a) is administered from about 100 micrograms up to about 300 micrograms per dose.

19. A method as defined in claim 17 wherein said administering is effected by the use of a self-propelled aerosol dosage form nebulizer unit.

20. A method as defined in claim 13 wherein said administering is effected by injection.

21. A method as defined in claim 20 wherein (a) is administered from about 100 micrograms up to about 500 micrograms per dose.

22. A method as defined in claim 13 wherein said compound is 7 - [3-hydroxy-2-(3-hydroxy-1-octenyl)-5-oxocyclopentyl]-5-heptenoic acid.

23. A method as defined in claim 13 wherein said compound is methyl 7 - [3 - hydroxy-2-(3-hydroxy-1-octenyl)-5-oxocyclopentyl]-5-heptenoate.

24. A method as defined in claim 13 wherein said compound is 7 - [3-hydroxy-2-(3-hydroxy-1-octenyl)-5-oxocyclopentyl]-heptanoic acid.

25. A method as defined in claim 13 wherein said compound is 7 - [3 - hydroxy-2-(3-hydroxyoctanyl)-5-oxo-cyclopentyl]-heptanoic acid.

26. A method as defined in claim 13 wherein said compound is 7 - [3,5 - dihydroxy-2-(3-hydroxy-1-octenyl)-cyclopentyl]-heptanoic acid.

27. A composition as defined in claim 1 wherein G is C=O, X is a trans double bond, Z is a single bond, and Y is a single bond or a cis double bond.

28. A method as defined in claim 13 wherein G is C=O, X is a trans double bond, Z is a single bond, and Y is a single bond or a cis double bond.

References Cited

Chem. Abst. (I), 58, Subj. Index, A–I, p. 10645 (1963).
Chem. Abst. (II), 59, Subj. Index, A–I, p. 1136 (1963).
Chem. Abst. (III), 60, Subj. Index, A–I, p. 1256s (1964).
Grollman: Pharmacology and Therapeutics, 6th ed., 1965, pp. 316–325.

STANLEY J. FRIEDMAN, Primary Examiner

U.S. Cl. X.R.

424—311